United States Patent
Robinson et al.

[15] 3,691,384
[45] Sept. 12, 1972

[54] NEUTRON-ABSORPTION CONTROLLER FOR NEUTRON ACTIVATION LOGGING

[72] Inventors: John C. Robinson; Myron K. Horn, both of Tulsa, Okla.

[73] Assignee: Cities Service Oil Company, Tulsa, Okla.

[22] Filed: Sept. 2, 1969

[21] Appl. No.: 854,425

[52] U.S. Cl.............................................250/84.5
[51] Int. Cl..............................................G21g 3/02
[58] Field of Search........250/84.5, 83.6 W, 84, 83.1; 176/39

[56] References Cited

UNITED STATES PATENTS

| | | | |
|---|---|---|---|
| 3,120,612 | 2/1964 | Youmans | 250/105 X |
| 3,538,330 | 11/1970 | Youmans | 250/108 R X |
| 2,951,943 | 9/1960 | Goodman | 250/84 X |

*Primary Examiner*—Archie R. Borchelt
*Assistant Examiner*—Davis L. Willis
*Attorney*—J. Richard Geaman

[57] ABSTRACT

The flux emitted during neutron activation logging is controlled by introducing a neutron-absorbing medium about the neutron-emitting section of a logging tool or sonde. Means are provided to control the rate of neutron-absorbing medium transportation so that a predetermined rate of flux is emitted from the sonde. By controlling the rate of flux emitted from the sonde, an energy gradient is produced such that at a later period of time a gamma ray measuring device may be utilized to log the well which will detect substantially equal levels of radiation at every depth in the well. The tendency of a high degree of gamma radiation existing in the latter portions of the irradiated wellbore is eliminated, thus allowing the use of a singularly scaled detector over the entire wellbore. A more easily measured radiation level results in greater resolution of the reservoir composition, and detection of specific elemental concentration is enhanced.

13 Claims, 3 Drawing Figures

PATENTED SEP 12 1972          3,691,384

JOHN C. ROBINSON
MYRON K. HORN
*INVENTORS*

BY J. RICHARD
GEAMAN

NEUTRON-ABSORPTION CONTROLLER FOR NEUTRON ACTIVATION LOGGING

BACKGROUND OF THE INVENTION

1. Field of the Invention

This invention relates to a neutron-absorption controlling system to be used in conjunction with neutron activation logging. More particularly, it relates to controlled introduction of an absorbing medium about the neutron-emitting source of a neutron activation-logging sonde.

2. Description of the Prior Art

"Activation analysis" is a term which has been used, since the development of the chain-reacting pile, to denote the very sensitive analytical technique of detecting trace elements in samples by means of neutron irradiation. As a well logging method, an intense fast neutron source is lowered into the borehole to produce the "activation" and a radiation detector is subsequently lowered to measure the "delayed or introduced radioactivity." As in the case of natural radioactivity, the gamma rays are detected by the logging instrument while the other, less penetrating radiation is absorbed by the rock and the iron housing of the logging tool. The elements most readily detectable in reservoir rocks are oxygen, silicon, aluminum, iron, magnesium, calcium, carbon, sulfur, and chlorine. Although others can be observed, these elements are the ones which appear to be of greatest interest in neutron activation logging.

In neutron activation logging the borehole is irradiated by a strong neutron-emitting source, quite frequently as the sonde is lowered into the borehole. The resultant gamma ray radiation levels are measured after a period of time as the sonde is withdrawn from the borehole. The inherent problem in such a procedure is the time differential between activation radiation and measurement of the gamma ray radiation. As the neutron source is a constant emittance device, the lower regions of the borehole are irradiated last and, therefore, have not dissipated the neutron-bombardment energy to the same degree as those portions of the wellbore higher in the formation. Thus, when the sonde is withdrawn from the wellbore the gamma ray detection device measures a higher energy level near the bottom of the hole, which exponentially decreases up the wellbore. Since normal logging practice dictates logging measurements to be made only when the sonde is being withdrawn from the well, so that accurate logging rates and sonde positioning can be obtained, complex corrections for these energy deviations are required and a multiple-scale measuring device for the gamma ray detection and recording is necessitated.

Elements having short half-lives can be measured sufficiently by the use of pulsed-neutron logging techniques, whereby short bursts of neutron flux are emitted from the neutron-emitting source and subsequent measurement of a desired energy spectrum is performed. This technique, however, is rather time consuming and complicated when elements having longer half-lives are involved. More desirable would be the continuous irradiation of the wellbore as the instrument is lowered into the well and subsequent continuous detection of gamma-ray radiation as the sonde is withdrawn from the wellbore.

It is an object of our invention, therefore, to provide an improved neutron activation-logging sonde.

It is another object of our invention to provide for controlling neutron flux from a neutron activation-logging sonde.

It is a further object of our invention to provide an absorbing medium for controlling the neutron flux from a neutron activation-logging sonde.

A still further object of our invention is to provide a control system which enhances the logging efficiency of the neutron activation-logging sonde by allowing for continuous irradiation of the formation as the sonde is lowered into the well and subsequent continuous measurement of the gamma ray radiation as the sonde is withdrawn from the wellbore.

With these and other objects in mind, the present invention is hereinafter described in detail and the novel features thereof are pointed out in the appended claims.

SUMMARY OF THE INVENTION

The present invention comprises a device for controlling the neutron-flux emittance from a neutron activation-logging sonde. The sonde comprises a neutron flux-emitting mechanism with means for transporting a neutron-absorbing medium such that control of the neutron flux is obtained. The sonde may also be equipped with a measuring device for the measurement and recording of the gamma ray radiation resulting from the previously controlled neutron bombardment.

In order to control the rate of neutron flux from the constant-emittance neutron source, a jacket is provided so as to encompass the neutron source. Said jacket is controllably filled with a neutron-absorbing medium such as fluidized neutron absorbent or a movable shield through which neutrons cannot penetrate. Means are provided to establish the rate of reversible absorbent transportation in order that the neutron flux emittance from the neutron source may be controlled.

The fluid neutron absorbent applied should be of sufficient quantity so as to be capable of absorbing the required amount of neutron flux, thereby controlling the neutron flux emitted from the sonde. Similarly, the movable shield through which neutrons cannot penetrate should be of sufficient composition that adequate control may be provided.

BRIEF DESCRIPTION OF THE DRAWING

Our present invention is hereinafter described in further detail with particular reference to the accompanying drawings in which.

DETAILED DESCRIPTION OF THE INVENTION

As indicated above, our present invention provides for a neutron-absorption controller for a neutron activation-logging sonde. An absorbing medium is introduced at a controlled rate about the neutron-emitting source such that a predetermined rate of neutron flux flows from the sonde. Means are provided for the control and transportation of the absorbing medium. A more detailed description is hereinafter made with reference to the accompanying drawings illustrating various embodiments of our present invention which may be employed to simplify the neutron activation-logging process.

Figure 1:
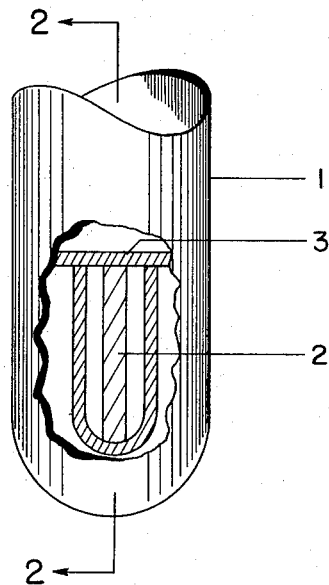
FIG. 1 represents a pictorial view of a typical neutron activation sonde with a cutaway view of the neutron-emitting source.

Referring to FIG. 1, the numeral 1 represents the cylindrical housing of the logging sonde. Neutron-emitting source 2 is located within the cylindrical housing so that it may emit a constant flux of neutrons throughout the wellbore. A non-penetrating neutron shield 3 is provided to prevent scatter of the neutron emissions and protect the other portions of the logging sonde from the neutron-emitting source. Whether the sonde has the neutron-emitting source located at any particular position within the sonde or whether the gamma ray detection device is contained within the same sonde housing or not are not a critical criteria for our invention.

Although the neutron activation-logging sonde depicted by FIG. 1 will achieve irradiation of the wellbore as the sonde is lowered into the well, the gamma ray detection device will not read the same level of energy as it is withdrawn from the well but rather will encounter an exponentially decreasing energy potential. This extreme potential gradient may be partially corrected by irradiating the wellbore from the bottom of the hole to the surface, lowering the sonde back to the bottom of the hole, and logging on the second withdrawal trip. Due to the exponential decay of the gamma radiation this procedure still is not satisfactory. The above-mentioned procedure would also require two wellbore trips in order to log the well properly.

Figure 2:
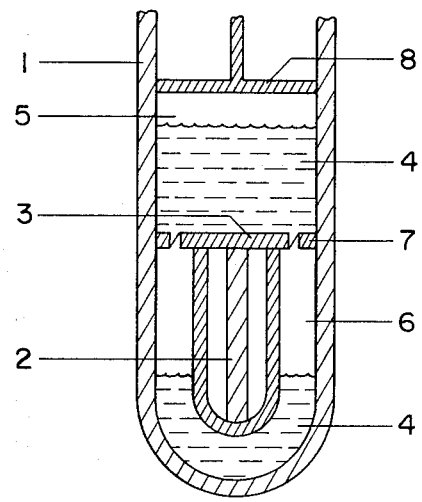
FIG. 2 represents a longitudinal sectional view of the neutron activation device taken along line 2—2 of FIG. 1, depicting the neutron-absorption controller of our present invention.

FIG. 2 depicts one embodiment of our invention; the sonde housing 1, neutron-emitting source 2, and non-penetrating neutron shield 3 are essentially the same as represented in FIG. 1. A neutron absorbing medium 4, however, is introduced into the neutron-emitting section 6 of the sonde to reduce the neutron flux which is available to irradiate the wellbore. Numeral 4 represents a body of neutron-absorbing medium which has been introduced into the neutron-emission chamber 6. The storage reservoir 5 contains the neutron-absorbing medium 4 which is introduced through control of the aperture 7 in the non-penetrating neutron shield 3. The control of aperture 7 may be effected by placing a pressure release valve therein. The rate of neutron absorbing-medium introduction is metered by control means 8 so that a controlled amount of neutron-absorbing medium may be regulated through aperture 7 and introduced about the neutron-emitting source 2.

The neutron-absorbing medium generally would be fluid in nature to facilitate its transportation about the neutron-emitting source 2. The neutron-absorbing medium 4 should be of sufficient neutron-capture cross-section so as to minimize any neutron escape from the encompassed portion of the neutron-emitting source.

Typical fluidized neutron-absorbing media would include a neutron-capture substance dissolved in a moderator such as ionic solutions of Group III or IV metals from the Periodic Table in an inorganic solvent such as water and heavy water. Powdered mixtures of the above-mentioned Group III and IV metals mixed with Period 2 elements from the Periodic Table or any other combination of conventional moderator combined with a neutron-capture substance may also be used. The above-mentioned neutron-absorbing medium is not limited to mixtures of moderators with neutron-capture substances but may conceivably include appropriate use of sufficient quantities of moderator or neutron-capture substance individually. For example, heavy water could be applied as a moderator to slow the fast neutrons to the thermal state using the sonde housing as the actual neutron-capture site. Inert gases from Group O of the Periodic Table such as argon or neon could also be used as a moderating medium in conjunction with the above-suggested procedure, again allowing the sonde housing to act as the neutron-capture site.

The means for controlling the aperture 7 in the non-penetrating neutron shield 3 through which the neutron-absorbing medium 4 is introduced may be comprised of any suitable valve mechanism and therefore is not shown in the drawings. A pressure release valve actuated by control means is a preferred embodiment of our invention but any regulating system may be employed. The control means used to actuate the introduction of the neutron-absorbing medium may consist of an actuating piston arrangement 8 as represented in FIG. 2 or any suitable substitute. A pressurized gas system could be incorporated as a control means such that pressurized gas is released from a storage cylinder within the sonde. The pressurized gas being employed against the neutron-absorbing medium 4 contained within storage reservoir 5 thereby forces it through aperture 7.

Figure 3:
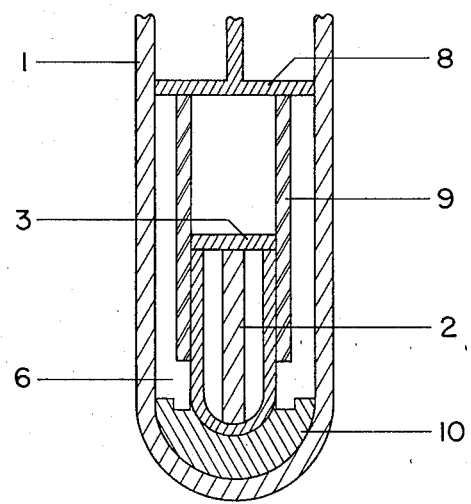
FIG. 3 represents a longitudinal sectional view of another embodiment of the neutron activation device depicting a non-penetrating neutron-shield mechanism.

FIG. 3 represents another embodiment of our invention where the neutron absorbing medium is represented by neutron-absorbing shield 9 composed of neutron-absorbing material. The shield 9 is positioned by control means 8. The neutron-absorbing shield 9 may be fully extended about the neutron-emitting source 2 so as to abut with a non-penetrating shield 10 also composed of neutron-absorbing material. The non-penetrating shield 10 has a recess such as to accept the lower portion of the neutron-absorbing shield 9 and form an interlocking network therewith.

The neutron-absorbing shield 9 may be comprised of any suitable material which will have the necessary rigidity so as to provide a jacket to encompass the neutron-emitting source 2 and to capture and absorb all the neutron flux to which it is exposed. The material of the neutron-absorbing shield 9 and non-penetrating shield 10 may be comprised of a metal or alloy from the Group III and IV elements of the Periodic Table. As in the above-mentioned neutron-absorbing medium, the neutron-absorbing shield may consist of a moderator applied in conjunction with the housing of the sonde, said housing serving as a neutron-capture site.

The neutron-emitting source used in conjunction with our invention may consist of any of the conventional capsule sources, as example: radium, actinium, californium 252, polonium or plutonium. The neutron-emitting source may be a mechanical device of the accelerator type employing the deuterium-tritum reaction as developed with the aid of a Van de Graaf generator. Typical of suitable neutron sources is their ability to emit a high flux of neutrons with a constant energy output, said output being entirely dependent upon the physical makeup of the source.

In the operation of a neutron activation-logging sonde, including the neutron-absorption controller of our present invention, the sonde is lowered into the wellbore at a predetermined logging rate. The length of the neutron-emitting source left unexposed to neutron-absorbing medium is controlled by the following equation:

$$\int_0^L f(1)dl = kN \exp\{\lambda[Z_0-Z]/R+D]\}$$

where $L$ is the length of exposed neutron-emitting source in inches; $k$ is the activation-radiation proportionality constant, in neutrons/gamma ray; $N$ is the desired constant gamma ray density which would exist in a homogeneous substance with property $\lambda$, in gamma rays/inch$^2$-sec.; $f(1)$ is the flux density of the radially symmetrical sonde as a function of distance 1 from the top of the neutron-emitting source, in neutrons/inch$^3$-sec.; $\lambda$ is the radiation constant of the activated substance, in sec.$^{-1}$; $Z_0$ is the total depth to the wellbore bottom, in ft.; $Z$ is the depth at which the wellbore is being irradiated, in ft.; $R$ is the sonde lowering rate, in ft./sec.; and $D$ is the time delay at the bottom of the well, in seconds.

Therefore, the neutron-absorbing medium is transported at a sufficient rate so that the gamma ray detection device will be measuring essentially the same potential level at every stratum level as it is withdrawn from the wellbore. This procedure allows the neutron activation logging of a well with one trip of the logging tool and greatly simplifies the gamma ray detection device required. Maximum gamma ray potential can be obtained at every point in the wellbore thereby affording greater resolution with the logging instrument. The present invention overcomes the problem of an exponential gamma ray potential throughout the wellbore, thereby eliminating the necessity for a double logging trip. No complex corrections are required, as those potentials obtained at any point in the wellbore may be directly correlated with all other potentials measured throughout the well. The present invention also permits direct correlation of neutron activation-logs from other similarly logged wells. The neutron-absorption controller provides a simple mechanism by which specific neutron flux may be used to irradiate a wellbore and thereby allow resolution of trace quantities of reactive elements contained within the formation. Our invention, therefore, provides a significant contribution to the art of neutron activation logging in that it permits the neutron activation logging of a wellbore in a single round trip of the logging sonde with a resultant increase in the resolution of the logged strata.

The present invention has been described herein with reference to particular embodiments thereof. It will be appreciated by those skilled in the art, however, that the various changes and modifications can be made therein without departing from the scope of the invention as set forth in the appended claims.

Therefore, we claim:

1. An improved neutron activation logging sonde comprising, in combination:
    a. a housing;
    b. a neutron-emitting source contained within the housing of said sonde;
    c. a fluid neutron absorbent medium capable of being positioned about said neutron-emitting source; and
    d. means for transporting said fluid neutron absorbing medium to a position about said neutron emitting source, said means comprising piston means and a pressure release valve adapted so that movement of said piston means forces said neutron-absorbing medium through said pressure release valve and positions it about the neutron emitting source, whereby the neutron flux emitted from said neutron-emitting source may be controlled so that a specified irradiation of the wellbore is obtained.

2. The apparatus of claim 1 wherein the fluid neutron-absorbing medium comprises a pressurized gas.

3. The apparatus of claim 1 in which said fluid consists of a neutron moderator and a neutron-capture substance having a neutron cross section sufficient to absorb the neutrons emitted from said neutron-emitting source whereby, said moderator slows the neutrons emitted to the thermal level such that they are absorbed by said neutron-capture substance.

4. The apparatus of claim 1 in which said fluid is a moderator selected from the Group O elements, the Period 2 elements, and compounds thereof, in combination with the sonde housing wherein said sonde housing is a metal selected from the Group consisting of Group III and IV of the Periodic Table and alloys thereof, acting as the neutron-capture site.

5. The apparatus of claim 3 in which said moderator is an inorganic liquid and said neutron-capture substance is a metal selected from the group consisting of Group III and IV of the Periodic Table in its ionic form dissolved in said inorganic liquid.

6. The apparatus of claim 3 in which said moderator is selected from the Period 2 elements and compounds thereof and said neutron-capture substance is a metal selected from the group consisting of Group III and IV of the Periodic Table and compounds of said metals.

7. An improved neutron activation-logging sonde comprising in combination:
    a. a housing;
    b. a neutron-emitting source contained within the housing of said sonde;
    c. a neutron-absorbing shield being composed of a neutron-capture substance, said neutron-capture substance being a metal selected from Groups II and IV of the Periodic Table and alloys thereof, capable of being positioned about said neutron-emitting source; and
    d. piston means adapted so as to cause reversible movement of said neutron-absorbing shield about the neutron emitting source whereby the neutron flux emitted from said neutron-emitting source may be controlled so that a specified irradiation of the wellbore is obtained.

8. The apparatus of claim 7 in which said neutron-capture substance is an alloy of a neutron moderator from the Periodic 2 elements and a metal selected from Groups III and IV of the Periodic Table and compounds thereof.

9. An improved neutron activation-logging sonde comprising, in combination:
 a. a housing;
 b. a neutron-emitting source contained within the housing of said sonde;
 c. a neutron-absorbing shield capable of being positioned about said neutron-emitting source; and
 d. means for positioning said neutron-absorbing shield about said neutron-emitting source comprising a pressurized gas system so as to cause reversible movement of said neutron absorbing shield about the neutron emitting source whereby, the neutron flux emitted from said neutron-emitting source may be controlled so that a specified irradiation of the wellbore is obtained.

10. The apparatus of claim 9 in which said neutron-absorbing shield conforms to the exterior surface of the neutron-emitting source.

11. The apparatus of claim 9 in which said neutron-absorbing shield is composed of a neutron-capture substance, said neutron-capture substance being a metal selected from Groups III and IV of the Periodic Table and alloys thereof.

12. The apparatus of claim 11 in which said neutron-capture substance is an alloy of a neutron moderator from the Periodic 2 elements and a metal selected from Groups III and IV of the Periodic Table and compounds thereof.

13. An improved neutron activation logging sonde comprising in combination:
 a. a housing;
 b. a neutron-emitting source contained within the housing of said sonde;
 c. a neutron-absorbing medium capable of being positioned about said neutron-emitting source; and
 d. means for transporting said neutron-absorbing medium to a position about said neutron-emitting source wherein said neutron-absorbing medium is positioned about the neutron-emitting source such that a portion of said neutron emitting source is left unexposed for a distance as expressed by the formula:

$$\int_0^L f(1) dl = kN(Z) \exp \{\lambda[Z_0 - Z]/R + D]\}$$

where $L$ is the length of exposed neutron-emitting source, in inches; $k$ is the activation-radiation proportionality constant, in neutrons/gamma ray; $N(Z)$ is the desired gamma ray density at depth $Z$, in gamma rays/inch-sec.; $f(1)$ is the flux density of the radially symmetrical sonde, in neutrons/inch-sec.; is the radiation constant of the activated substance, in sec.$^{-1}$; $Z_0$ is the total depth to the wellbore bottom, in ft.; $Z$ is the depth at which the wellbore is being irradiated, in ft.; $R$ is the sonde lowering rate, in ft./sec.; and $D$ is the time delay at the bottom of the well, in seconds.

* * * * *